UNITED STATES PATENT OFFICE.

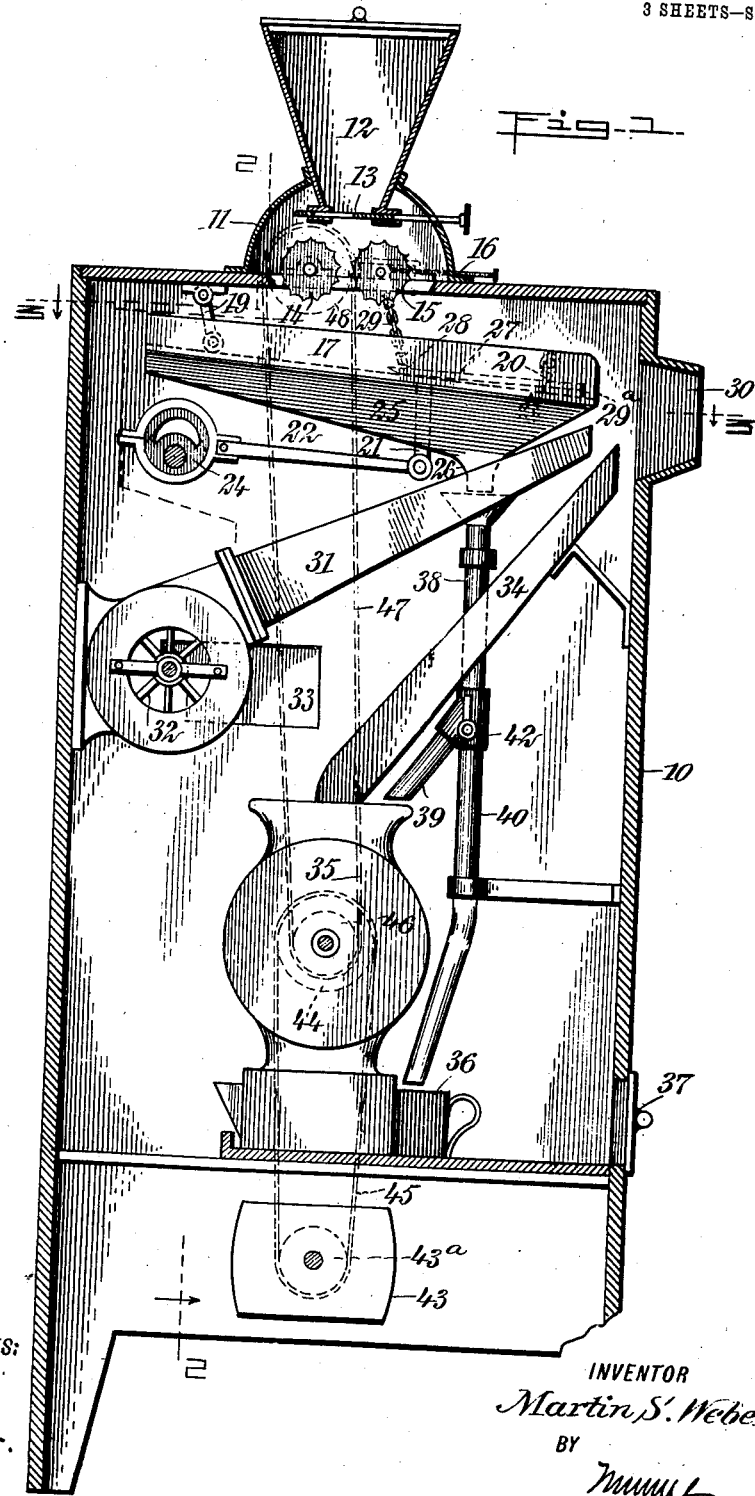

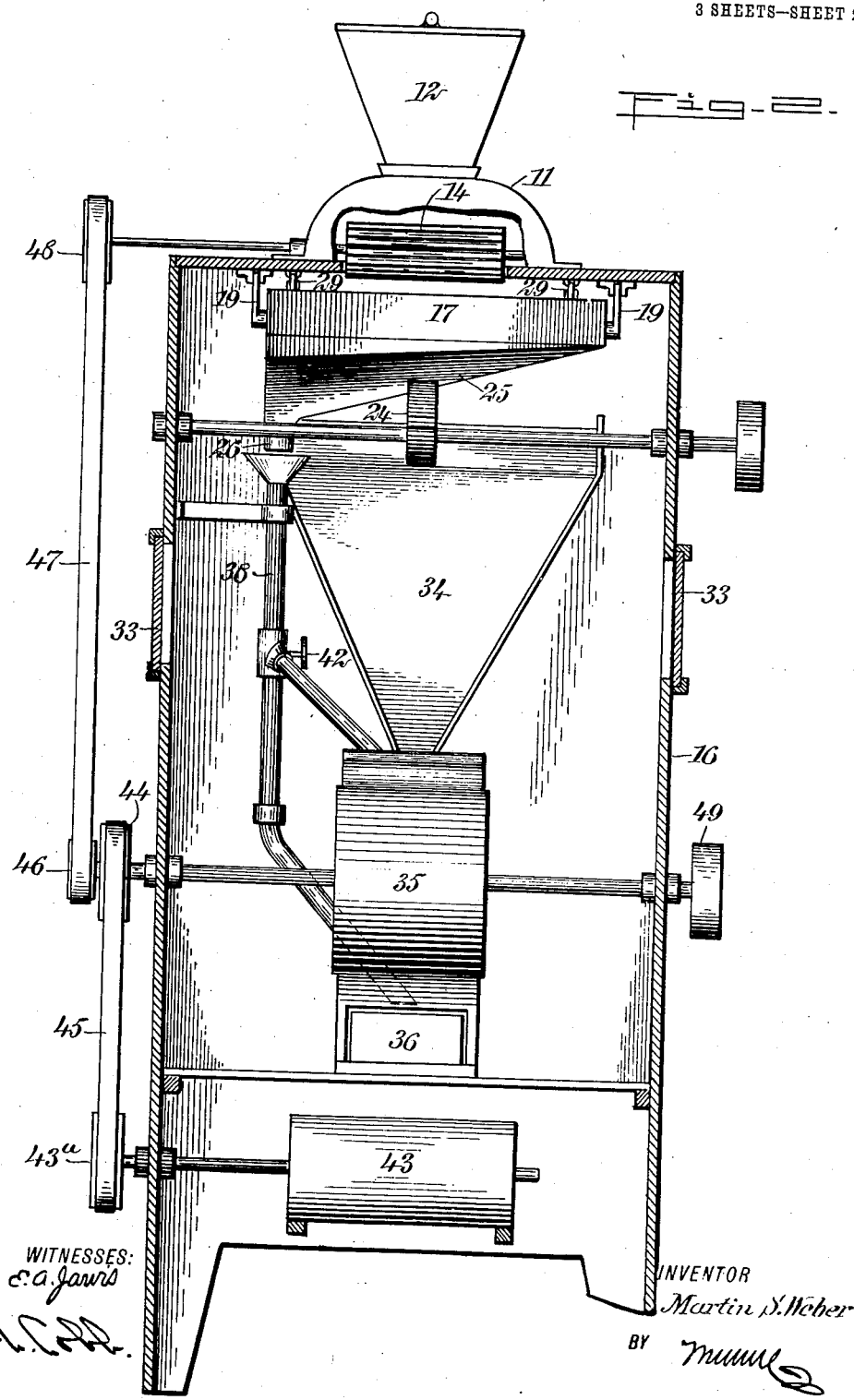

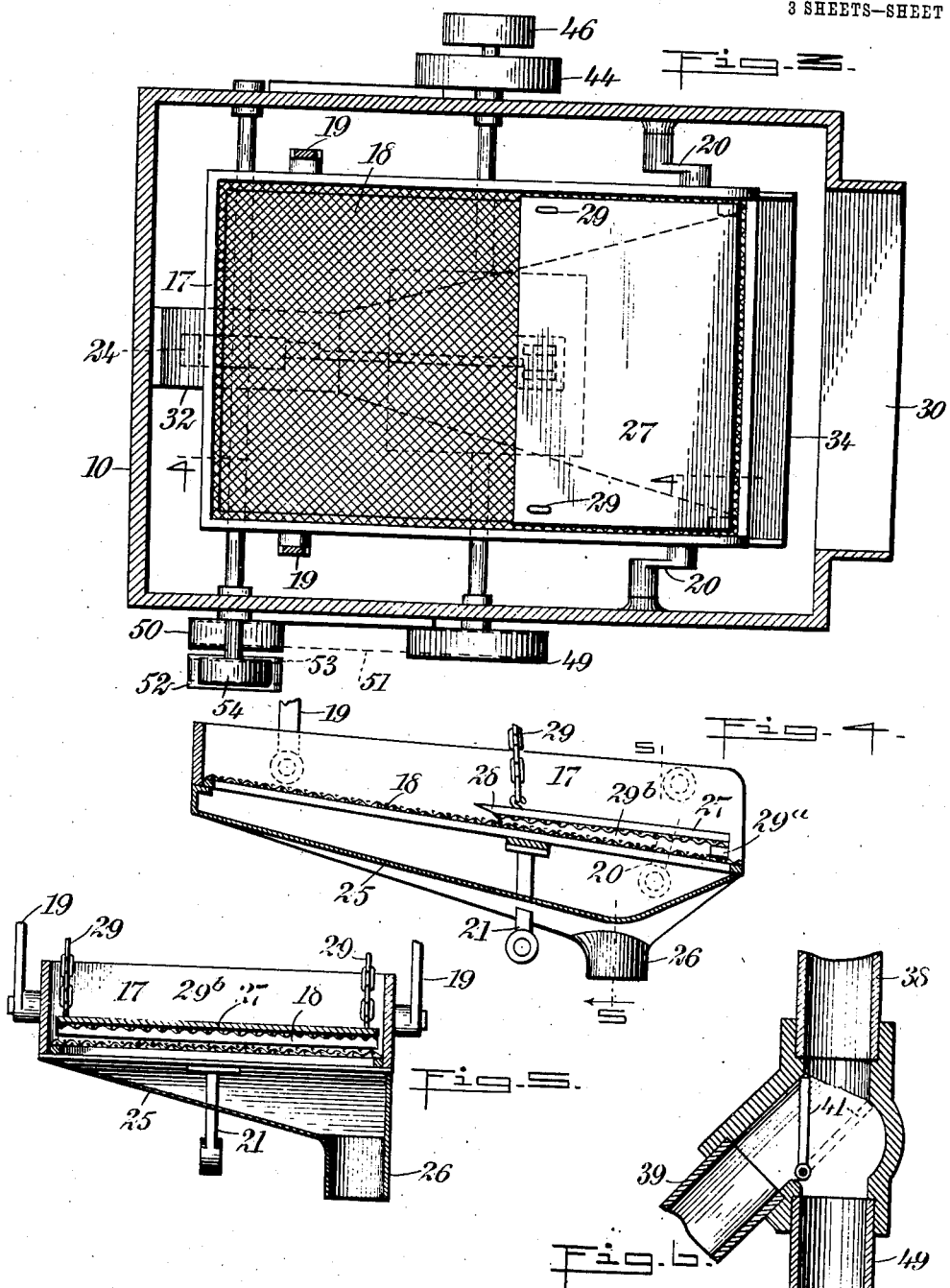

MARTIN S. WEBER, OF EPHRATA, PENNSYLVANIA.

REDUCING AND SEPARATING SYSTEM.

No. 830,387.      Specification of Letters Patent.      Patented Sept. 4, 1906.

Application filed May 2, 1905. Serial No. 258,437.

*To all whom it may concern:*

Be it known that I, MARTIN S. WEBER, a citizen of the United States, and a resident of Ephrata, in the county of Lancaster and State of Pennsylvania, have invented a new and Improved Reducing and Separating System, of which the following is a full, clear, and exact description.

My invention relates to reducing and separating systems, and is especially adapted for operating upon coffee. A coffee-berry has, between and within its sections, an integument, which is a continuation of the hull and which is not removed in preparing the coffee for market. This contains a considerable amount of tannic acid, which impairs the flavor of the beverage made from the coffee and renders it unhealthful. To remove this substance and to furnish a convenient means for reducing or grinding the berry for use by the consumer are the principal objects of my invention.

Reference is to be had to the accompanying drawings, forming a part of this specification, in which similar characters of reference indicate corresponding parts in all the views.

Figure 1 is a vertical longitudinal section through one embodiment of the invention, taken just inside the wall of the casing. Fig. 2 is a transverse vertical section therethrough on the line 2 2 of Fig. 1. Fig. 3 is a horizontal section on the line 3 3 of Fig. 1. Fig. 4 is a longitudinal sectional detail through the screen-shoe, it being taken on the line 4 4 of Fig. 3. Fig. 5 is a transverse section through the shoe on the line 5 5 of Fig. 4, and Fig. 6 is a sectional detail showing the controlling-valve operating between the branches of the conduit.

From the top of a suitable casing 10 is mounted a housing 11, which supports a hopper 12. At the bottom of the hopper is a gate 13 for controlling the delivery of material to a pair of cracking or dividing rolls 14 and 15, which are situated in an opening in the top of the casing. The former of these rolls is rotatable in fixed bearings, while that numbered 15 preferably has movable bearings which may be shifted and fixed in position to vary the relation of the roll to its companion by suitable adjusting-screws 16.

Below the rolls is a shoe 17, having extending across it a screen 18, inclined downwardly toward the delivery end and supported by pairs of rear and forward links 19 and 20, respectively. The angles occupied by these links are preferably such that when the shoe moves forwardly or in the direction of downward inclination the rear links will be rising while the forward links are falling, thus securing the proper tilting movement to effect the advance of material over the screen. Projecting from the bottom of the shoe is an arm 21, to the lower end of which is pivoted a rod 22 from the strap of an eccentric 24, the shaft of which is rotatably mounted in the casing. Across the bottom of the shoe below the screen is a board or collector 25, which converges toward the opening in a funnel 26. Above the screen is situated a rubbing member in the form of a board or plate 27, the feed or entrance end of which converges inwardly at 28 toward the surface of the screen to facilitate the introduction of the material operated upon. The rubber at this end is connected to relatively fixed points, as the casing, by links or flexible members 29. This connection, while modifying the movement of the rubber with respect to the screen, does not hold it out of contact therewith, its weight preferably being supported by the screen or material passing over it at this point. At the opposite end the rubber is shown as provided with blocks or spacing members 29ª, which maintain it out of engagement with the screen, so that there shall not be undue friction between the parts when the apparatus is running comparatively empty. The under side of the board 27 is shown as provided with a covering of screen material 29ᵇ, this presenting a roughened surface and increasing the effectiveness and durability of the rubber.

Through the casing, opposite the delivery end of the shoe, is an opening 30, toward which is directed the extremity of a blast-conduit 31, terminating just below the end of the screen and leading from a fan 32. The eye-openings of the fan may be varied to regulate the blast by means of slides 33 moving in ways upon the outside of the casing. From below the end of the screen and blast-conduit a chute 34 leads to a grinding mechanism or mill 35 of any usual or convenient type. Below the mill may be mounted a receptacle 36 accessible through an opening normally closed by a door 37. The shoe-funnel delivers to the end of a conduit 38, which is sufficiently expanded to permit the reciprocating movement of the shoe. This conduit, above the mill, divides into branches 39 and 40, the former delivering with the chute 34 to the interior of the mill and the latter outside, it preferably terminating above a receptacle 36. To control the passage of material through these branches, a valve 41 is provided, which is pivoted at the intersection and provided with a finger-piece 42 by which it may be operated.

In the bottom of the casing is shown a motor 43, which may be of any desired type and which has a pulley 43ª connected to a pulley 44 upon the mill-shaft by a belt 45. The mill-shaft also has fast upon it a pulley 46, from which a belt 47 passes over a pulley 48, fast upon the shaft of the roll 14. The mill-shaft, at the opposite side of the casing from the pulleys 44 and 46, has a pulley 49, over which and a pulley 50 upon the fan-shaft operates a belt 51. This fan-shaft also carries a pulley 52, which is joined by a belt 53 with a pulley 54, fixed upon the eccentric-shaft. The diameters of the various pulleys are such that under the normal motor speed the proper relative rate of rotation will be imparted to the elements.

In the use of the apparatus the coffee-berries or other material to be operated upon are fed from the hopper between the rolls, which so break up or divide them that the intermediate section is released. This chaff and the berry then fall upon the screen, the former being of such a tough and woody character that it is not itself broken up, remaining on the upper side of the screen with the greater part of the body of the berry, while some finer particles of the body which are produced in the process of division fall through upon the bottom board. As the chaff and large pieces advance, portions of said chaff clinging to the body of the berry, they enter between the inclined end of the rubber and the screen. The former is held to a considerable extent against longitudinal movement by its supporting members, while the screen is reciprocated by the eccentric connection. As a result the material is scoured between the two surfaces and the clinging pieces of chaff separated. The mixed material now tails over the end of the screen, it falling through the blast from the conduit 31, which is of sufficient strength to blow the chaff from the apparatus through the opening 30. The pieces of the berry, however, are of great enough weight (the lighter particles having been removed by the screen) to resist this blast, and falling downward are received by the chute 34, which conveys them to the mill. Here they are ground to any desired degree of fineness, this depending on the adjustment of the grinding elements, and falling through are delivered to the receptacle. The portion which has fallen through the screen upon the bottom board is discharged by the funnel into the conduit. If the grinding is to be of a somewhat coarse character, this is already sufficiently reduced, and it is therefore conveyed by the branch conduit 40 directly to the receptacle, the valve being in its vertical position. If, however, the material is to be "pulverized," or finely reduced, the valve is shifted to its inclined position, which will cause the material from the funnel 26 to enter the mill through the branch conduit 39 and be operated upon with that tailing over the end of the screen.

Having thus described my invention, I claim as new and desire to secure by Letters Patent—

1. The combination with a screen and a mill, of means for delivering the material tailing over the screen at all times to the mill, and means for delivering the material passing through the screen either to the mill or outside said mill.

2. The combination with a screen and a mill, of a bottom board for the screen having an opening, a conduit to which the opening in the bottom board delivers, said conduit having branches extending to the mill and outside said mill, means for controlling the flow through the conduit branches, and a chute leading from the end of the screen to the mill.

3. The combination with means for cracking or breaking material, of a screen, a rubbing member coöperating with the screen, a mill, means for delivering the material tailing over the screen to the mill, and means for delivering the material passing through the screen either to the mill or outside said mill.

4. In a coffee-grinding apparatus, the combination of means for breaking or cracking the berries, a reciprocating screen-shoe, a grinding-mill into which the material tailing over the screen at all times passes, a branched chute into which discharges the material passing through the screen, one of the branches of the chute discharging into the mill, and a valve in the chute for causing the material to pass through either branch thereof.

5. A coffee-grinding apparatus, comprising cracking or breaking rolls, a reciprocating shoe below the rolls, a screen in the shoe, a rubbing member above and coöperating with the screen, a fan for delivering an air-current at the end of the screen, a grinding mechanism, a chute leading from below the end of the screen-shoe to the grinding mechanism, and a branched and valved chute leading from the bottom of the screen-shoe, one of the branches of the chute discharging into the grinding mechanism.

6. A coffee-grinding apparatus, comprising cracking or breaking rolls, a reciprocating shoe below the rolls and provided with a screen, a rubbing member above the screen and coöperating therewith, a fan for delivering air-current at the end of the screen, a grinding mechanism, a chute leading from below the end of the shoe and discharging into the grinding mechanism, and a chute leading from the bottom of the shoe and discharging into the grinding mechanism.

7. A coffee-grinding apparatus, comprising cracking or breaking rolls, a reciprocating screen below the rolls, a rubbing member above the screen and coöperating therewith, a fan having a blast-conduit terminating below the discharge end of the screen, a grinding mechanism, and a chute leading from below the discharge end of the screen and the blast-conduit and discharging into the grinding mechanism.

8. A coffee-grinding apparatus, comprising cracking or breaking rolls, a reciprocating screen below the rolls, a fan for delivering an air-current at the discharge end of the screen, a grinding mechanism, a chute leading from the discharge end of the screen and discharging into the grinding mechanism, a branched chute receiving the material passing through the screen, one of the branches of the chute discharging into the grinding mechanism, and a valve in the said chute for causing the material to pass through either branch thereof.

9. A coffee-grinding machine, comprising cracking or breaking rolls, a reciprocating shoe below the rolls, a screen in the shoe, a fan having a blast-conduit terminating below the discharge end of the shoe, a grinding-mill, a chute leading from below the discharge end of the shoe and the blast-conduit and discharging the material tailing over screen at all times into the mill, and a chute leading from below the bottom of the shoe and also discharging into the mill.

10. A coffee-grinding machine, comprising cracking or breaking rolls, a reciprocating shoe below the rolls, a screen in the shoe, a fan having a blast-conduit terminating below the discharge end of the shoe, a grinding-mill, a chute leading from below the discharge end of the shoe and the blast-conduit and discharging into the mill, a branched chute leading from below the bottom of the shoe and having one member discharging into the mill, and a valve in the said chute for controlling the passage of the material through the branches thereof.

In testimony whereof I have signed my name to this specification in the presence of two subscribing witnesses.

MARTIN S. WEBER.

Witnesses:
   A. P. RISSER,
   WM. FAUST.